(No Model.) 2 Sheets—Sheet 1.

I. M. HOUSE.
SHINGLE SAWING MACHINE.

No. 346,369. Patented July 27, 1886.

Witnesses.
F. B. Fetherstonhaugh
J. M. Jackson

Inventor
I. M. House
by
Donald C. Ridout
Atty (No Model.)  2 Sheets—Sheet 2.

I. M. HOUSE.
SHINGLE SAWING MACHINE.

No. 346,369. Patented July 27, 1886.

Witnesses.
F. B. Fetherstonhaugh
J. M. Jackson

Inventor.
I. M. House
by
Donald C. Ridout & Co
Atty

UNITED STATES PATENT OFFICE.

ISAAC M. HOUSE, OF GRAVENHURST, ASSIGNOR OF THREE-FOURTHS TO ALFRED RUGGLES WILLIAMS, OF TORONTO, ONTARIO, CANADA.

SHINGLE-SAWING MACHINE.

SPECIFICATION forming part of Letters Patent No. 346,369, dated July 27, 1886.

Application filed December 10, 1885. Serial No. 185,291. (No model.)

*To all whom it may concern:*

Be it known that I, ISAAC MILTON HOUSE, of the village of Gravenhurst, in the district of Muskoka, in the Province of Ontario, Canada, machinist, have invented certain new and useful Improvements in Shingle-Sawing Machines, of which the following is a specification.

The object of the invention is to simplify and otherwise improve the construction of a shingle-sawing machine; and it consists, essentially, of the specific construction and arrangement of parts, hereinafter more particularly described in detail.

Figure 1:
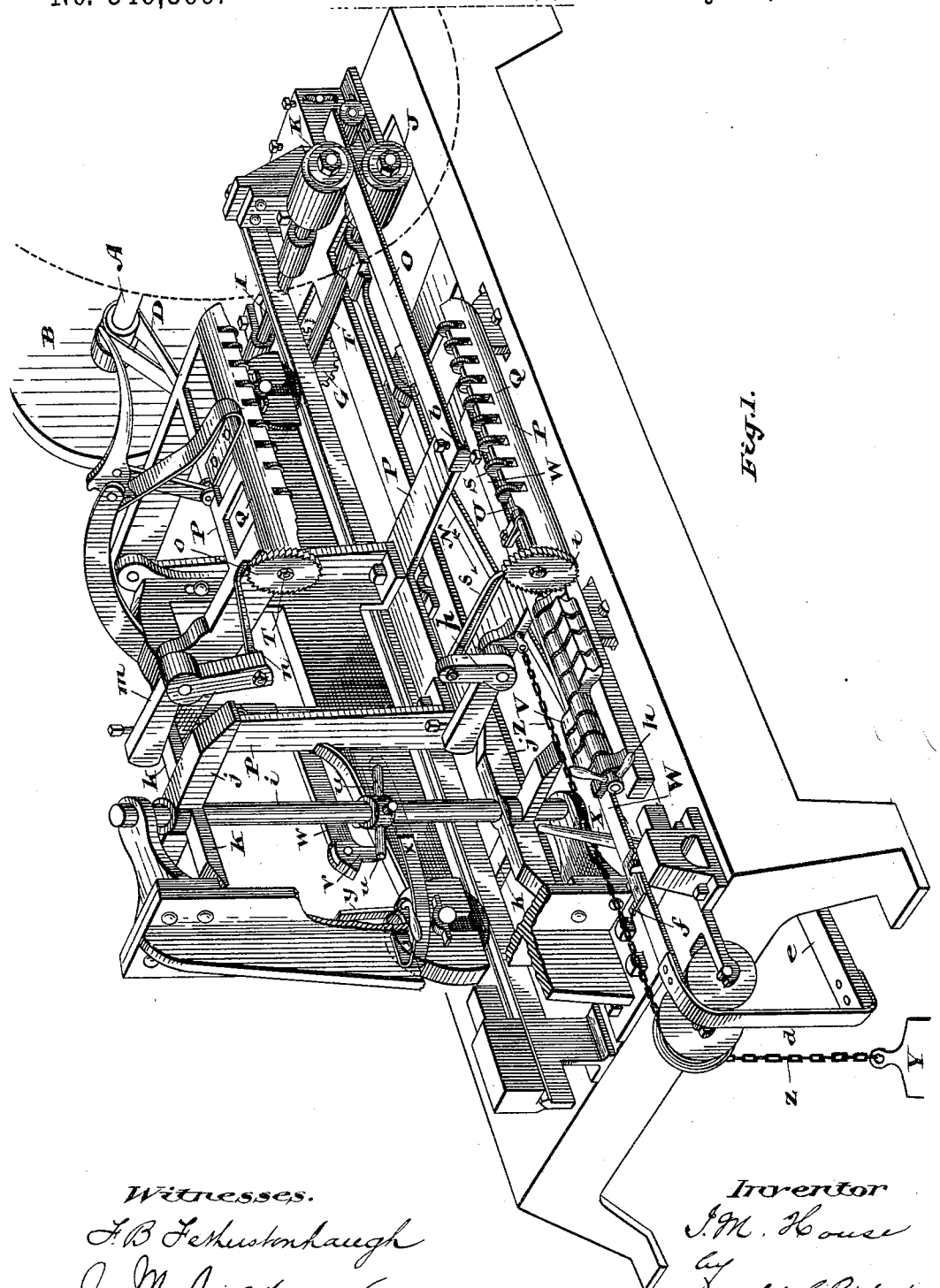
Figure 2:
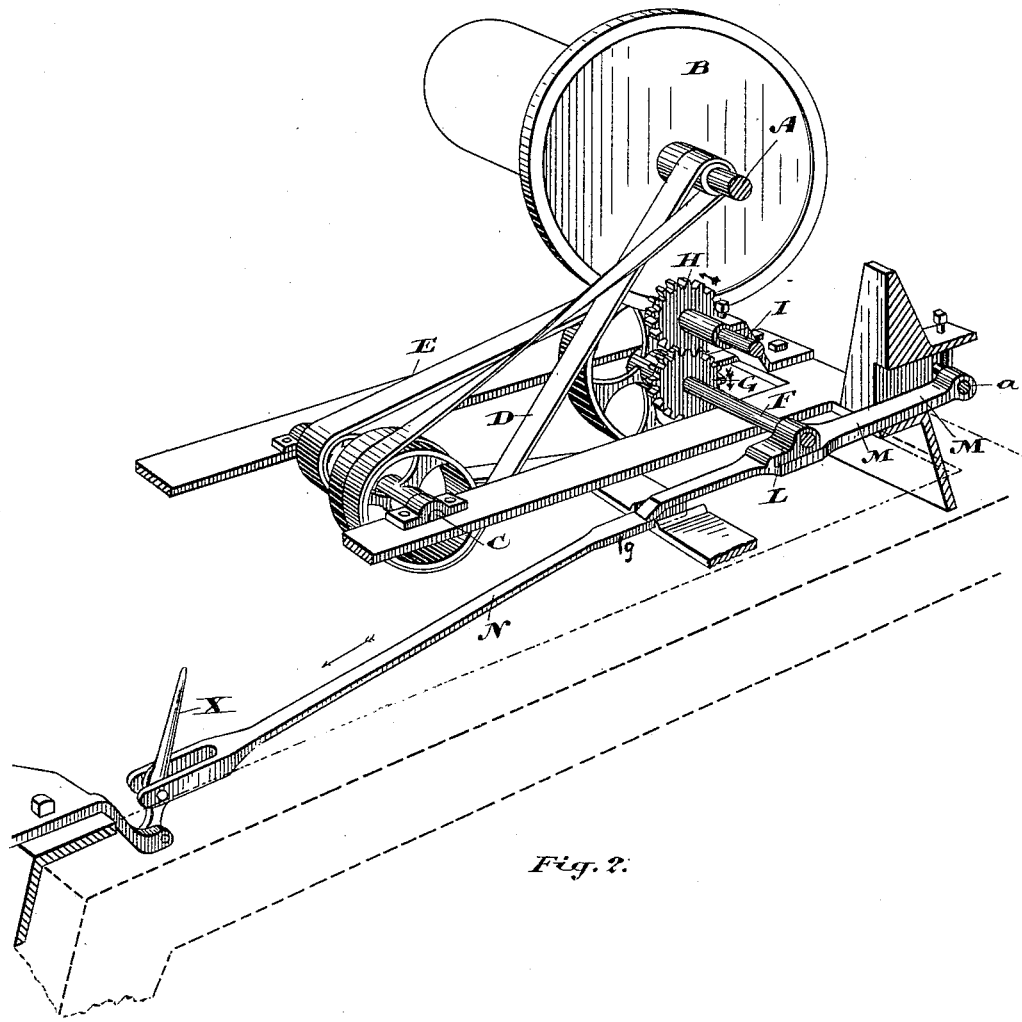

Figure 1 is a perspective view of my improved shingle-sawing machine. Fig. 2 is a perspective detail, showing the driving-gear of same.

Before pointing out the particular parts involved in my invention I shall first briefly explain the general construction of the machine.

A represents the main driving shaft or spindle on which the saw is attached, but which is not shown in the drawings, except by dotted lines in Fig. 1.

B is an ordinary balance-wheel, connected to the shaft A in the ordinary way, and which shaft is connected to the intermediate shaft, C, by the belt D, as indicated. The belt E connects the intermediate shaft, C, with the shaft F, on which shaft the spur-wheel G is fixed. This spur-wheel meshes with the spur-wheel H, fixed to the spindle or shaft I, and being thus driven, as described, the shafts or spindles F and I revolve in the direction indicated by arrows so long as the shaft or spindle A is in motion.

J is a paper friction-roller fastened to the spindle or shaft F, and K is a similar friction-roller fastened to the spindle or shaft I. The spindle or shaft F is supported in the bearing-box L, which is carried on the bar M, pivoted at *a* to the frame of the machine, and supported at its other end by the end of the rod N. When the rod N is in the position indicated in the drawings, the friction-roller K is sufficiently far from the friction-roller J to permit the free passage of the draw-bar O, which is connected, as indicated, to the carriage P. When the rod N is drawn back in the direction indicated by arrow, its enlarged end will naturally raise the pivoted bar M, and in this manner the friction-roller K presses the draw-bar O hard up against the friction-roller J, and when these two rollers are revolving, as before described, they will naturally act on the draw-bar O, and through it draw the carriage P toward them. The block out of which the shingles are to be cut is carried in the usual way between the two heads Q and R, being gripped between the toothed wheels S, fixed to the spindles T and U, carried, respectively, in the heads Q and R, as indicated. When the carriage P is drawn forward by the action of the friction-rollers J and K, as described, the particular dog V, which may be set for that purpose, comes in contact with the stop *b*, fitted upon the trip-bar W. The other end of this trip-bar is connected by the strap *d* to the spring-bar *e*, and has a finger, *f*, projecting from it, so that when the trip-bar W has been drawn up by the action of the moving carriage sufficiently far to bring the finger *f* in contact with the lever X the said lever is pushed over by the action of the finger *f*, and the rod N thus pushed forward so as to carry its enlarged end *g* into the position in which it is indicated in the drawings, thus permitting the bottom friction-roller, K, to drop clear of the draw-bar O, which, when released, permits the carriage to spring back by the action of the spring-bar *e* and weight Y, which is attached to the carriage P by the chain Z, as indicated. The handle *h*, which has been pushed over from the position in which it is indicated in the drawings till it projects over the trip-bar W, comes in contact with the lever X, pushing back the said lever, and through the rod N causes the friction-rollers J and K to once more grip the draw-bar O, and the action of the machine described is repeated.

The only point of improvement in this portion of the machine consists in the action of the friction-rollers J and K upon the draw-bar O, the other parts mentioned being similar to mechanism employed in other machines.

With the view of automatically altering the angle of the block out of which the shingles are being cut, for the purpose of alternately cutting the thick end of the shingle from the top and bottom of the block, I provide the following simple and effective mechanism: *i* is a vertical spindle suitably journaled in the frame of the machine, as indicated, and having two heads with four arms, one at or near each end, as shown. The two arms *j* in each head are made thicker than the other two arms, (marked *k*.) *m* is a bell-crank, one arm of which extends over the arms on the top head, while the other arm of the bell-crank is provided with a ratchet-pawl, *n*, arranged to engage with the ratchet-wheel *o*, connected to the spindle T. A corresponding bell-crank, *p*, is provided with a similar ratchet-pawl, *s*, to engage with the ratchet-wheel *t*, fixed to the spindle U. The other arm of the bell-crank *p* extends over the arms on the bottom head of the spindle *i*. *u* represents four fingers fixed to and extending from the spindle *i*, and *v* represents a dog pivoted on the arm *w*, extending from and fixed to the carriage P. Each time that the carriage P is moved forward, as before described, the dog *v* comes in contact with one of the fingers *u*, causing the spindle *i* to revolve one-fourth of a revolution. The spring *x*, acting on the fingers *u*, holds the spindle stationary when the dog *v* is brought back by the return of the carriage. It will be noticed on reference to Fig. 1 that when the thin arm *k* is underneath the arm of the bell-crank *m* the thick arm *j* is under the arm of the other bell-crank, *p*. Consequently, as the spindle *i* is made to revolve, the thick and thin arms are brought alternately into action, thereby causing, through the mechanism hereinbefore described, the spindles T and U to revolve in proportion to the movement of their respective bell-cranks *m* and *p*, thus altering the angle of the block, so that the thick end of the shingle shall be alternately taken from its top and bottom. As it may be sometimes desirable not to make this change, I provide a bridge, *y*, pivoted in the frame of the machine and arranged so that it may be dropped down on top of one of the fingers *u*, forming a bridge to support the dog *v* and keep it from acting on the said fingers.

What I claim as my invention is—

1. The draw-bar O, connected at one end to the carriage P, and arranged to pass between the paper friction-rollers J and K, in combination with said rollers, bar M, and rod N, and connections by which the rollers J and K are caused to grip and operate the draw-bar O, as herein specified.

2. The bell-cranks *m* and *p*, connected, as described, to the spindles T and U, in combination with the vertical spindle *i*, arranged in proximity to said bell-cranks, and the arms *j* and *k*, fixed to the spindle *i*, and arranged to actuate the bell-cranks, as herein specified.

3. The spindle *i*, having arms *j* and *k* and fingers *u* fixed to it, as specified, in combination with the pivoted dog *v*, carried by the carriage, arranged substantially as specified.

4. The spindle *i*, having arms *j* and *k* and fingers *u* fixed to it, as specified, in combination with the pivoted dog *v*, carried by the carriage, and spring *x*, bearing on the fingers *u*, substantially as and for the purpose specified.

5. The spindle *i*, having arms *j* and *k* and fingers *u* fixed to it, as specified, in combination with the pivoted dog *v* on the carriage, spring *x*, bearing on the fingers *u*, and bridge *y*, pivoted to the frame of the machine, substantially as and for the purpose specified.

6. The combination, with the carriage P and draw-bar O, connected thereto, of the friction-rollers J K, bar M, pivoted at *a* to the frame of the machine and sleeved on the shaft of the roller J, rod N, supporting the free end of the bar M, and means for reciprocating said rod, substantially as and for the purposes specified.

7. The combination, with the bell-cranks *m p*, of the vertical spindle *i*, arms *j k*, secured thereto near opposite ends thereof, and provided with beveled ends, the fingers *u*, secured to said spindle between the ends thereof, and the spring *x*, secured to the frame of the machine and arranged to bear against the fingers *u*, substantially as and for the purpose specified.

Toronto, November 14, 1885.

ISAAC M. HOUSE.

In presence of—
CHARLES C. BALDWIN,
F. BARNARD FETHERSTONHAUGH.